United States Patent
Bullivant

[11] 3,887,111
[45] June 3, 1975

[54] DENSITY CONTROL FEEDER SYSTEM

[75] Inventor: Kenneth W. Bullivant, Turnersville, N.J.

[73] Assignee: K-Tron Corporation, Glassboro, N.J.

[22] Filed: June 7, 1973

[21] Appl. No.: 367,981

[52] U.S. Cl. ............................................... 222/57
[51] Int. Cl. ............................................. B67d 5/08
[58] Field of Search .......... 222/55, 57, 134; 177/70, 177/121

[56] References Cited
UNITED STATES PATENTS

| | | | |
|---|---|---|---|
| 3,042,258 | 7/1962 | Mayes | 222/57 X |
| 3,139,216 | 6/1964 | Mell | 222/57 X |
| 3,724,720 | 4/1973 | Bullivant | 222/55 |

Primary Examiner—Robert B. Reeves
Assistant Examiner—Thomas E. Kocovsky
Attorney, Agent, or Firm—Seidel, Gonda & Goldhammer

[57] ABSTRACT

A density control feeder system in which a material of variable density may be fed at a constant preselected density. The system may be comprised of a first and a second feeder. The first feeder may feed a material having a density less than the preselected density. The second feeder may feed material having a density greater than the preselected density. The density of the material fed by the two-feeders is computed and/or monitored. This density is compared with a set point density in a comparison circuit.

The output of the comparison circuit controls the proportioning of mass flow set point pulses between the first and second feeders to maintain the density at the preselected value.

8 Claims, 5 Drawing Figures

DENSITY CONTROL FEEDER SYSTEM

BACKGROUND OF THE INVENTION

This invention relates to a density control feeder system. More particularly, this invention relates to a density control feeder system in which a first feeder feeding material having a density less than the desired density and a second feeder feeding material having a density greater than the desired density are controlled in response to the combined density of the material fed by both feeders.

It is highly desirable in numerous manufacturing, processing and packaging operations to be able to accurately control the density of a material being processed or packaged. One of the numerous areas in which such a density control feeder system is highly desired is in the manufacturing and/or packaging of freeze dried coffee.

In the manufacture of freeze dried coffee, it is practically impossible in uniformly control the density of the freeze dried coffee produced. Therefore, the freeze dried coffee produced has a variable density. The freeze dried coffee so produced has a number of serious disadvantages. First, the coffee so produced does not produce a uniform coffee taste in the coffee cup even though the same volume of coffee may be used in the making of the various cups of coffee. Secondly, but not least important, is the fact that such coffee is sold by weight. However, the coffee is usually sold in glass jars. A problem is presented due to the variable density of the coffee in that a consumer will not but or take from the supermarket shelf a jar of coffee which is not full even though it may contain the same amount of coffee by weight as other full jars. Prior to the present invention, the only solution to the problem by the coffee manufacturers and packagers was to fill every jar to the top irregardless of the weight of the coffee. In addition to producing non-uniform coffee to the taste, this practice was very costly to the large coffee manufacturers since it necessitated the literal giving away of a very large number of pounds of coffee each day.

SUMMARY OF THE INVENTION

The present invention provides a method and apparatus for providing a preselected density of material having a variable density. The present invention uses a first controllable feeder for feeding material having a density less than the preselected density and a second feeder for feeding material having a density greater than the preselected density. Even the density of the materials in the first and second feeder may be variable as long as one has a greater and the other has a lesser than the preselected density.

Briefly, in accordance with the present invention, a method of feeding material having a variable density at a preselected density is provided. The method comprises the steps of feeding material having a density less than the preselected density through a first controllable feeder and feeding materials having a density greater than the preselected density through a second controllable feeder. Signals are generated responsive to a preselected set point density and to the actual material density fed by both the first and second controllable feeder. The rate of feed of the first and second controllable feeder is controlled in response to the generated signals to provide a material having the preselected density. In accordance with the apparatus of the present invention, apparatus for feeding a variable density material at a preselected density is comprised of a first controllable feeder for feeding material having a density less than the preselected density and a second controllable feeder for feeding material having a density greater than the preselected density. Means are provided for computing the density of the material fed by said first and second controllable feeders. The computed density is compared in comparison means with a set point density and a comparison signal is generated in response thereto. Means for generating mass flow set point signal is provided. The mass flow set point signal is operated on by means for generating a first and second complementary signal in accordance with the comparison signal. The first complementary signal is applied to the first controllable feeder as a set point signal and the second complementary signal is applied to the second controllable feeder as a set point signal whereby the first and second controllable feeders are controlled to produce the preselected set point density.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DESCRIPTION OF THE PREFERRED EMBODIMENTS

Figure 1:
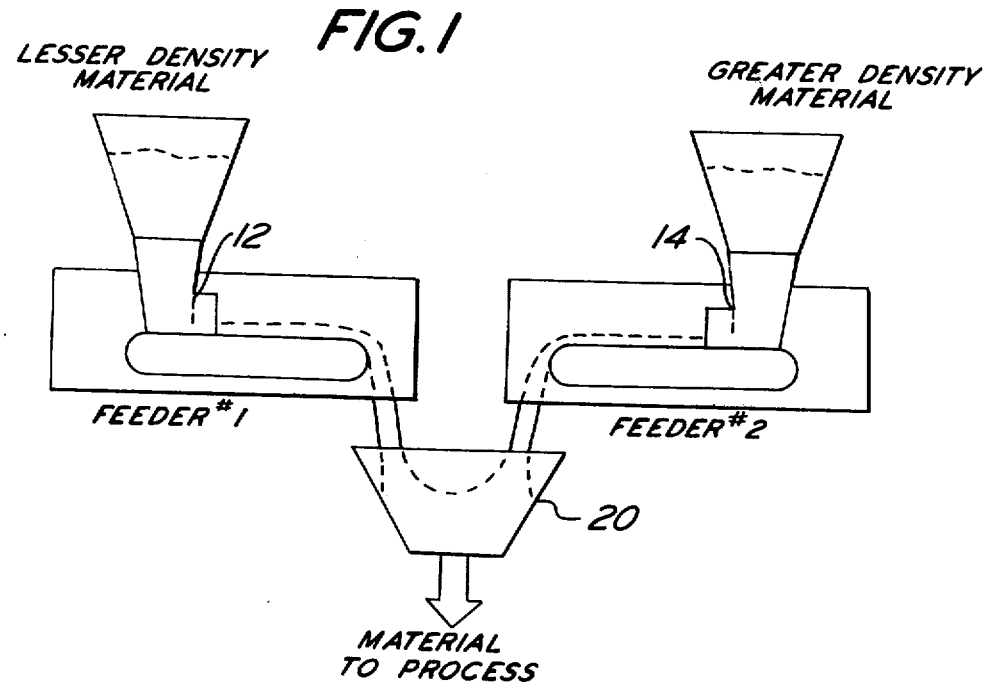
FIG. 1 is a drawing of a density control feeder system in accordance with the present invention.

Referring now to the drawings in detail, wherein like numerals indicate like elements, there is shown in FIG. 1, feeder 1 and feeder 2. Feeders 1 and 2 may be digital feeders as shown in U.S. Pat. No. 3,724,720, invented by the inventor herein, and assigned to the assignee of the present invention. In accordance with the present invention, one of the feeders is supplied with a material having a lesser density than the desired density and the other feeder is provided with a material having a density greater than the desired density. It may be noted that the labeling of the feeders 1 and 2 is clearly nothing more than nomenclature and the labeling may be reversed. However, as a concrete example, and not by way of limitation, material having a lesser density than the desired density is fed by feeder 1 and material having a density greater than the desired density is fed by feeder 2. The amounts of material fed individually by feeder 1 and feeder 2 into hopper 20 may be controlled by circuits shown in FIGS. 2a and 2b or FIG. 4. By providing the proper feed rate to feeder 1 and to feeder 2, the exact preselected density of material will be generated in hopper 20. Hopper 20 may be a suitable mixing device if required in the particular application. However, in most cases, a suitable hopper will provide sufficient mixing of the outputs of feeder 1 and feeder 2. Feeders 1 and 2 maintain a constant volumetric flow for a constant speed of operation by means of the controlled apertures 12 and 14. These apertures may be variable apertures but would be set at a particular setting for a particular mode of operation.

Figure 2B:
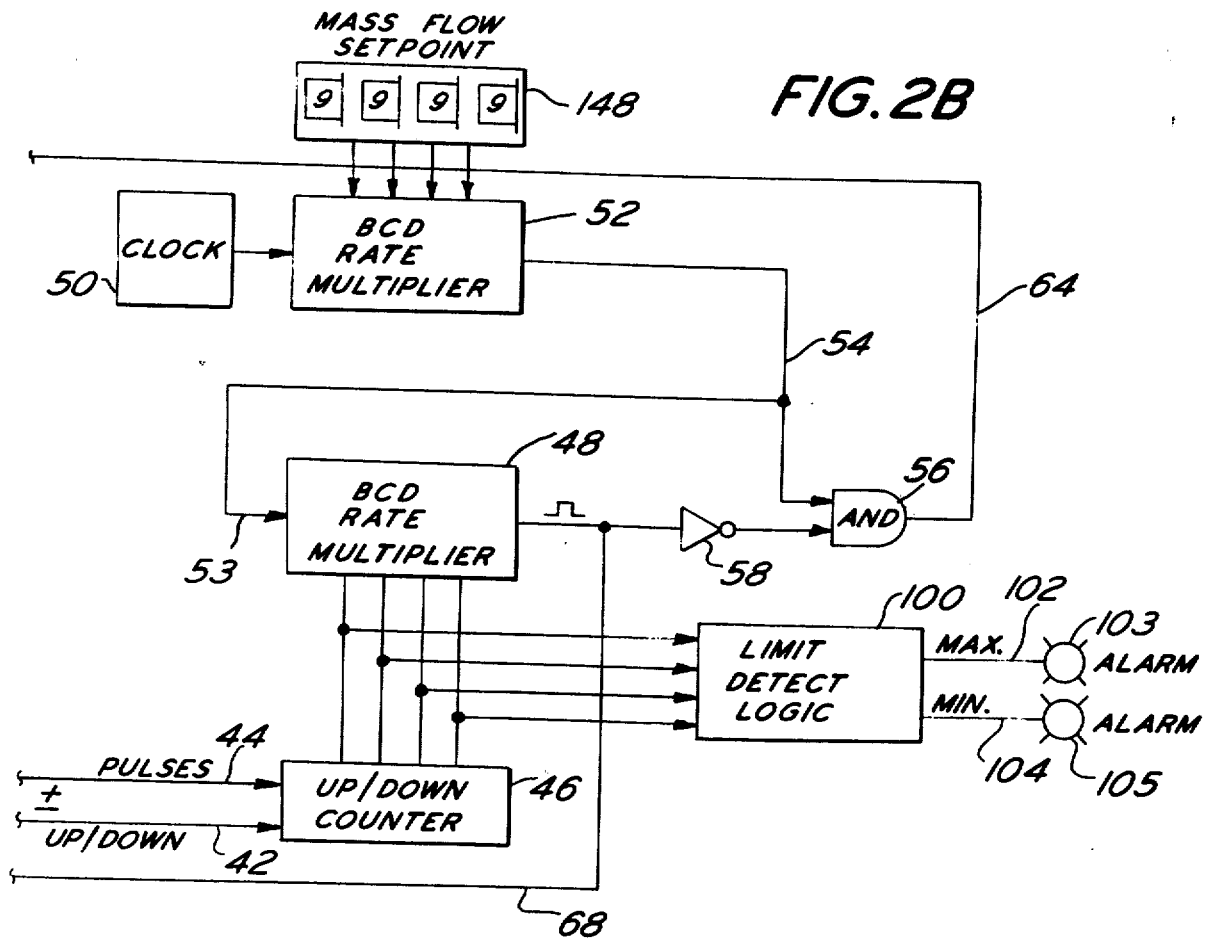
FIGS. 2a and 2b form a schematic diagram, partially in block diagram form, of a density control feeder system in accordance with the present invention.
Figure 2A:
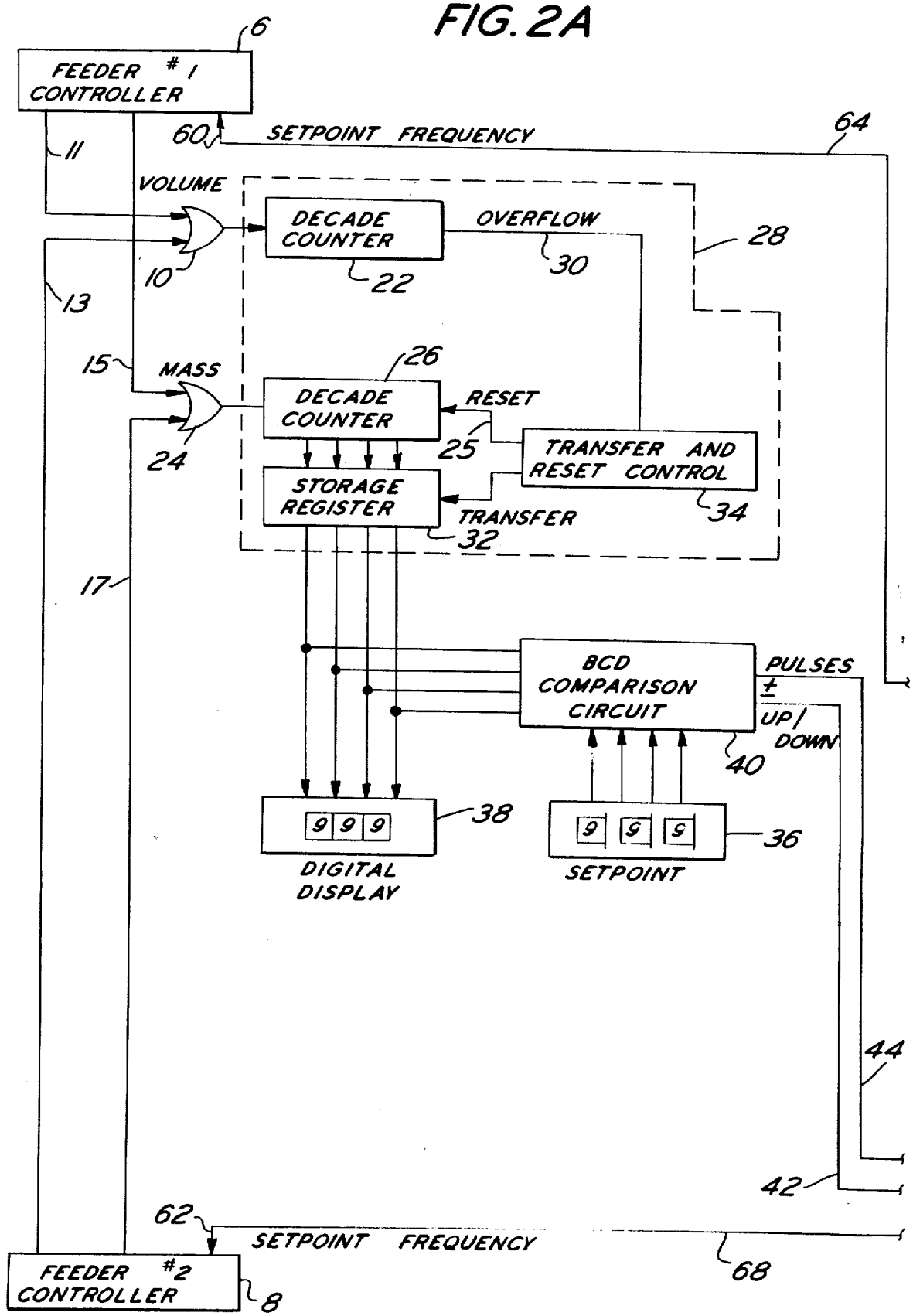

Referring now to FIGS. 2a and 2b, there is shown the feeder 1 controller 6 and the feeder 2 controller 8. Controllers 6 and 8 may contain circuitry as shown in U.S. Pat. No. 3,724,720, referred to above, or as shown in United States patent application Ser. No. 345.039 entitled Conveyor Memory System, invented by the inventor herein and assigned to the assignee of the present invention. The outputs of controllers 6 and 8 on lines 11 and 13 may be a pulse train having a pulse rate proportional to the speed of the feeders. Since the area of the material deposited on the belt is kept constant by the controlled apertures 12 and 14, these speed signals represent volume. The lines 11 and 13 may be taken from the output of encoder 28 in U.S. Pat. No. 3,724,720. These speed pulses on lines 11 and 13 are applied to OR gate 10. All of the pulses on lines 11 and 13 are passed by OR gate 10 and therefore the output of OR gate 10 is a combination pulse train having a pulse rate equal to the sum of the pulse rates provided by controllers 6 and 8. The pulses applied to OR gate 10 are of a very short duration and therefore there is a very low probability of overlap. However, an alternative embodiment is to provide an anti-coincidence circuit on the input to OR gate 10 in order to eliminate any possibility of losing a pulse. Such an anti-coincidence circuit is shown at 38 in U.S. Pat. No. 3,724,720.

Each pulse of the pulse train output of OR gate 10 represents an increment of volume fed into hopper 20. These pulses are applied to and counted by binary coded decimal counter 22 in computer 28. Computer 28 computes the composite density of the output of feeders 1 and 2. That is, computer 28 computes the density of the total material being fed into hopper 20. This density is equal to the total mass flow divided by the total volumetric flow.

The outputs of controllers 6 and 8 on lines 15 and 17 are pulse trains having a pulse rate proportional to the mass flow of the feeders. These signals are applied to the inputs of OR gate 24. The pulse trains on lines 15 and 17 may be obtained from the outputs of rate multiplier 29 as shown in U.S. Pat. No. 3,724,720. The output of OR gate 24 is a pulse train having a pulse rate equal to the sum of the pulse rates on lines 15 and 17. OR gate 24 may also be provided with an anti-coincidence circuit on its inputs as discussed with respect to OR gate 10. The output of OR gate 24 is applied to and counted in binary coded decimal decade counter 26.

Referring to the operation of computer 28 in detail, decade counter 22 is counted up until it overflows. Decade counter 22 may be a three-decade counter which is counted up to a count of 1,000 or it may be a decade or straight binary counter of any other suitable number of decades or stages. For the purposes of providing a specific example, but not way of limitation, it may be assumed that decade counter 22 is a three-decade counter which is counted up to a count of 1,000, at which count it overflows. When decade counter 22 receives the 1,000th pulse, an overflow signal is generated on line 30. The overflow signal on line 30 triggers transfer and reset control circuit 34 which causes the count stored in decade counter 26 to be transferred to storage register 32. In other words, the count to which decade counter 26 is counted at the instant that overflow pulse occurs on line 30 is transferred from decade counter 26 to storage register 32. Upon completion of the transfer of the count from decade counter 26 to storage register 32, decade counter 26 is reset via line 25.

The output of storage register 32 is applied to digital display 38. Digital display 38 displays the actual density of the material in hopper 20. The output of storage register 32 is also applied to binary coded decimal comparison circuits 40. Set point thumb wheel switches 36 are used to set the desired or preselected set point density into the system. Thumb wheel switches 36 may be any suitable conventional and well known thumb wheel switches.

The actual density signal output from storage register 32 is compared with the desired or preselected density set point signal supplied by set point density thumb wheel switches 36 in comparison circuit 40. Comparison circuit 40 may be any suitable comparison circuit providing the functions specified herein after or may be as shown in United States patent application 263,085 filed JUne 15, 1972 entitled Modular Batch Weighting Control System and Method, invented by the inventor herein and assigned to the assignee herein. This application is now U.S. Pat. No. 3,763,993.

The output of comparison circuit 40 provides pulses and an indication of which of its inputs is higher than the other. In other words, the output of line 42 provides an indication of whether the set point value is above or below the density value output of storage register 32. The pulses on line 44 are equal to the difference between the set point value and the density value being read out of storage register 32.

The outputs of comparison circuit 40 are supplied to up/down counter 46. Up/down counter 46 may be a binary coded decimal counter, a straight binary counter or any other suitable type of counter. However, the type of counter used for up/down counter 46 would determine the type of rate multiplier used for rate multiplier 48. In other words, up/down counter 46 must be compatible with rate multiplier 48. Therefore, assuming that up/ down counter 46 is a binary coded decimal counter, rate multiplier 48 should also be a binary coded decimal type of rate multiplier.

Up/down counter 46 may be a conventional up/down counter which is commercially available and which receives two inputs. Up/down counter 46 may be a Texas Instruments, Inc. integrated circuit type SN 74,190 which has the up/down gating logic included on the chip. This integrated circuit type SN 74,190 uses a single up/down count control line as shown in the drawings. Alternatively, an up/down counter arrangement may be used as disclosed in patent application Serial No. 345,039, filed Mar. 26, 1973, entitled Conveyor Memory System and assigned to the assignee herein. This application is now United States Patent Alternatively, any other suitable type of up/down counter arrangement may be used.

Although there are numerous methods and means for carrying out the present invention, one specific example will be discussed herein for the purposes of illustrating the invention and not by way of limitation. Although specific count up and count down signals will be discussed in a herein it is apparent to those skilled in the art that these signals may be June by simply reversing the assignment of feeders Weighing the greater and lesser density material. Similarly, various lines could be interchanged, such as lines 64 and 68 to controllers 6 and 8, respectively. Numerous other variations are possible. However, for the sake of concreteness, specific conditions are discussed herein.

Assuming, as throughout this application, that feeder 1 is feeding the lesser density material and feeder 2 is feeding the greater density material, a negative or count down signal will be on the output of line 42 of comparison circuit 40 when the density output signal from storage register 32 exceeds the set point value set in set point density thumb wheel switches 36. A positive or count up signal will be supplied to up/down counter 46 if the density reading output of storage register 32 is less than the setting on set point density thumb wheel switches 36. The output of up/down counter 46 determines the rate of multiplication of rate multiplier 48.

A mass flow set point pulse train is received on input 53 of rate multiplier 48 from a mass flow set point system similar to that disclosed in U. S. Pat No. 3,724,720. The desired total mass flow is set into mass flow set point thumb wheel switches 148. Clock 50 provides a pulse train input to rate multiplier 52. The output of rate multiplier 52 is a pulse train on line 54 having a number of pulses proportional to the desired mass flow. This pulse train on line 54 is supplied as one input to AND gate 56 and to input 53 of rate multiplier 48.

A rate multiplier is a device which provides an output pulse for each input pulse only at a value of one or the maximum value being present on its second input. Therefore, the number of output pulses on the output of rate multiplier 48 will be some percentage (0 to 100 percent) of the pulses on the input. One suitable and commercially available rate multiplier for rate multiplier 48 is a Texas Instrument, Inc. integrated circuit type SN 74,167. However, any other suitable rate multiplier may be used.

Inverter 58 causes AND gate 56 to pass pulses from rate multiplier 52 only when there is an absence of a pulse on the output of rate multiplier 48. The function of rate multiplier 48, inverter 58 and AND gate 56 is to provide a splitting function with respect to the output of rate multiplier 52 or, in other words, to form two complementary signals from the output of rate multiplier 52. The output of rate multiplier 52, which is the desired total mass flow, is divided between feeder 1 and feeder 2 and supplied to feeders 1 and 2 via lines 64 and 68, respectively. The output of AND gate 56 is supplied to input 60 of controller 6 of feeder 1 via line 64. The output of rate multiplier 48 is supplied to input 62 of controller 8 of feeder 2 via line 68. The signals on input 60 and 62 of feeders 6 and 8, respectively, comprise a set point pulse train for the feeders. As one specific example, these signals on input 60 and 62 could be substituted for the output of rate multiplier 36 in U.S. Pat. No. 3,724,720 if feeders 1 and 2 were of that type.

With respect to feeders 1 and 2, it is preferable that these feeders have the same scaling. In other words, the load cells should have the same ranges and the outputs of the speed sensors should preferably be the same for the speed of operation. Generally, it is preferable that the same rate of speed be provided by the two feeders or a specified input pulse rate. However, it is not necessary that the two feeders be scaled identically. If there is a difference between the feeders, a scaling network may be inserted in series with either line 64 or 68 to compensate for the difference in the feeders.

In operation, in a case where the output of storage register 32 or in other words the density output reading is less than the desired set point on set point density thumb wheel switches 36, up/down counter 46 would be counted up causing a greater number of pulses to appear on the output of rate multiplier 48. The causes a greater number of pulses to be fed back to input 62 controller 8 of feeder 2 via line 68. This causes the effective pulse rate of the set point pulse train on line 68 to increase and thereby cause the rate of feed of feeder 2 to be increased. Since feeder 2 is feeding material having a greater density than the desired or preselected density, the density of the material being fed into hopper 20 increases. This causes a decrease in the difference between the density output of storage register 32 and the density setting on set point switches 36. The system adjusts in this manner until an accurate density output is being fed into hopper 20. Although this system described is a feed back or searching type of system, the system will zero in very rapidly to provide an accurate density since the rate of correction is determined by the rate of error which is measured by the output of comparison circuit 40 on line 44. In other words, when the error is greater, a larger number of pulses appear on line 44 and produce a rapid change in the rate of multiplication of rate multiplier 48 via a rapidly changed count in up/down counter 46.

Limit detector logic 100 detects predetermined high and low limits of the count in up/down counter 46. When a high or low limit is reached, an alarm 103 or 105, respectively, is energized. Alarms 103 and 105 may be any suitable type of alarm or combination of alarms such as audible sounders and visible lamps. Limit detector 100 may be detect an overflow condition of up/down counter or a count in up/down counter which is too low.

Figure 3:
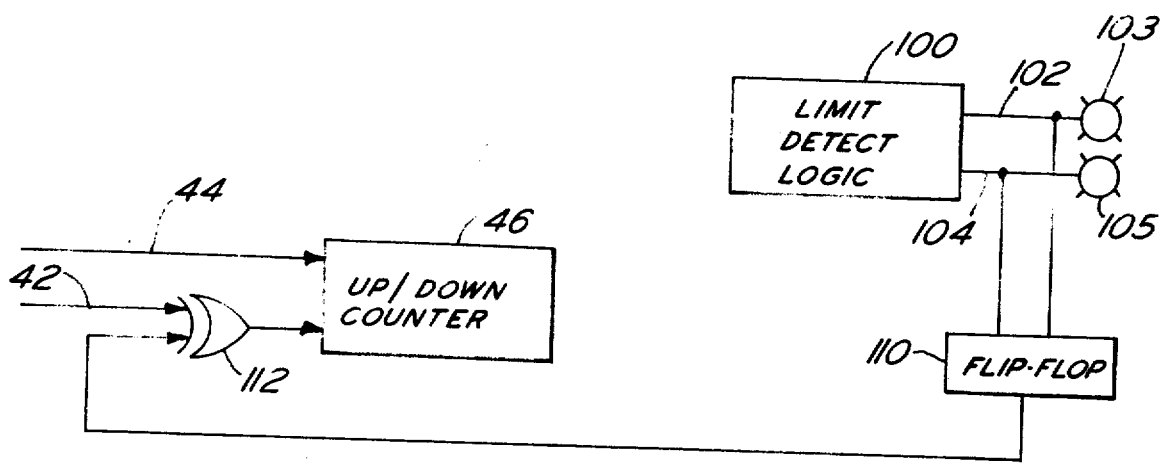
FIG. 3 is a schematic diagram, partially in block diagram form, of a modification of the schematic diagram of FIG. 2b in accordance with the present invention.

An alternative embodiment is shown in FIG. 3 in which a flip flop 110 is connected to receive the signal outputs on lines 102 and 104 of limit detect logic 100. An output of flip flop 110 is fed back to exclusive OR gate 112 connected in series with line 42. Flip flop 110 in connection with exclusive OR gate 112 would automatically compensate for a case where the material being fed through the feeders was switched. In other words, they would automatically compensate for a case wherein the greater density material was being fed through feeder 1 and the lesser density material was being fed through feeder 2. In this embodiment, the up/down counting of counter 46 would be automatically reversed.

Figure 4:
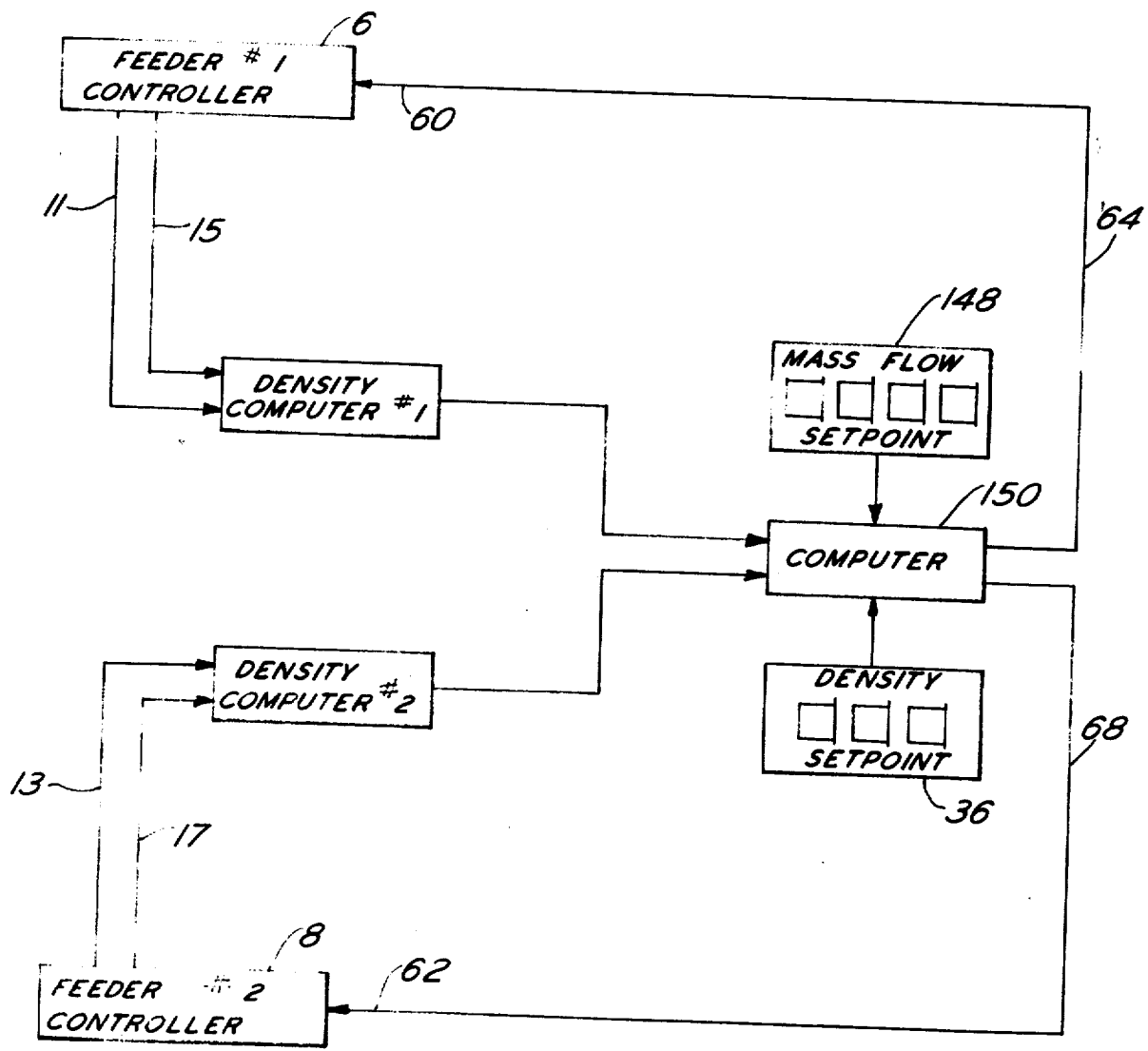
FIG. 4 is a schematic diagram in block diagram form of another embodiment of the present invention.

An alternative embodiment of the present invention is shown in FIG. 4. In FIG. 4, the volume or speed pulse trains on lines 11 and 13 of controller 6 and 8, respectively, are fed to density computers 1 and 2, respectively. The mass flow pulse trains on lines 15 and 17 of controllers 6 and 8, respectively, are also fed to density computers 1 and 2, respectively. Density computers 1 and 2 may be any suitable type of digital circuitry for computing the density of the material. In other words, the signal representing the mass flow would be divided by the signal representing the volume flow to produce a signal indicative of the density at each instant. The outputs of density computers 1 and 2 would be fed to a special purpose or general purpose computer 150. This computer may be any general purpose computer programmed for this specific operation. Computer 150 would instantaneously calculate the desired flow rate of each of the feeders in response to the density calculations received from density computers 1 and 2, density set point thumb wheel switches 36 and mass flow set point thumb wheel switches 148. The outputs of computer 152 to controllers 6 and 8 could be complementary pulse trains as discussed above. Alternatively, they could be complementary binary coded decimal digital signals which in a case where feeders 1 and 2 are of a type as disclosed in U.S. Pat. No. 3,724,720 would be fed as an input to rate multiplier 36 of that patent in lieu of thumb wheel switches 40 of that patent. The two signals on lines 64 and 68 are complementary in that the two would form or comprises the total mass flow. In other words, if the total mass flow were one, then examples of digital coded signals could be 0.7 and 0.3 or 0.6 and 0.4. Similarly if a mass flow of one requires a pulse train of 10 pulses per second, 7 pulses could be on one line and 3 on the other at any instant of time depending upon the density conditions.

It will be apparent to those skilled in the art that various modifications can be made to the structure and operation of the density control feeder system described herein while remaining within the spirit and teachings of the present invention. For example, various other types of circuits may be used to perform essentially the same function. In addition, various other means may be used to carry out the teachings of the present invention. The signals within the system may be processed in various other manners to produce essentially the same results.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. A method of feeding variable density material at a preselected density, comprising the steps of:
   feeding material having a density less than the preselected density through a first controllable digital feeder;
   feeding material having a density greater than the preselected density through a second controllable digital feeder;
   generating digital signals responsive to a preselected set point density and to the actual density of the material fed by both said first and second controllable feeders; and
   controlling the rate of feed of said first and second controllable feeders in response to said generated signals to provide a material having the preselected density.

2. A method of feeding a variable density material at a preselected density, comprising the steps of:
   feeding material having material having a density less than the preselected density through a first controllable digital feeder;
   feeding material having a density greater than the preselected density through a second controllable digital feeder;
   digitally computing a digital composite density signal of the material fed by said first and second controllable feeders;
   digitally comparing the composite density signal with a digital density set point signal and generating a digital difference signal responsive to the difference between the composite density signal and the density set point signal and a polarity signal indicative of which signal exceeds the other; and
   producing a first digital signal for controlling the rate of feed of said first controllable feeder and a complementary second digital signal for controlling the rate of feed of said second controllable feeder, said first and second signals being responsive to the difference signal and to the polarity signal.

3. Apparatus for feeding material having a variable density at a preselected density, comprising:
   a first controllable digital feeder for feeding material having a density less than the preselected density;
   a second controllable digital feeder for feeding material having a density greater than the preselected density;
   digital means for computing the density of material fed by said first and second controllable feeders;
   digital means for comparing the computed density with a set point density and generating a digital comparison signal responsive thereto;
   digital means for generating a digital mass flow set point signal;
   digital means for generating a first and second digital complementary signals from the mass flow set point signal in response to the comparison signal, said first complementary signal being supplied to said first controllable feeder as a set point signal and said second complementary signal being applied to said second controllable feeder as a set point signal whereby said first and second controllable feeders are controlled to produce the preselected set point density.

4. Apparatus in accordance with claim 3 wherein said computing means comprises:
   a first digital density computer for computing the density of the material fed by said first controllable feeder;
   a second digital density computer for computing the density of material fed by said second controllable feeder; and
   digital means for combining the densities computed by said first and second density computers.

5. Apparatus in accordance with claim 3 including means for detecting whether the material having a density greater than the preselected density is being fed by the wrong controllable feeder and means for automatically compensating therefor.

6. Apparatus in accordance with claim 3 wherein said computing means comprises:
   digital means for adding the digital mass flow signals of said first and second controllable feeders to provide a digital total mass flow signal;
   digital means for adding the digital volumetric flow signals of said first and second controllable feeders to provide a digital total volumetric flow signal; and
   digital means for dividing the total mass flow signal by the total volumetric flow signal to produce a digital signal indicative of the density of the material fed by said first and second controllable feeders.

7. Apparatus in accordance with claim 6 wherein the mass flow signals are pulse train signals and said adding means comprises an OR gate for receiving the mass flow pulse trains of said first and second controllable feeders and the output of said OR gate is applied to a counter.

8. Apparatus in accordance with claim 6 wherein the volumetric flow signals are pulse train signals and said adding means comprises an OR gate for receiving the volumetric flow pulse trains of said first and second controllable feeders and the output of said OR gate is applied to a counter.

* * * * *